US012660800B2

(12) United States Patent
Eftelioglu et al.

(10) Patent No.:    US 12,660,800 B2
(45) Date of Patent:         Jun. 23, 2026

(54) AUTOMATED POULTRY OR LIVESTOCK WELFARE TRACKING

(71) Applicant: Cargill, Incorporated, Wayzata, MN (US)

(72) Inventors: Emre Eftelioglu, Puyallup, WA (US); Hugo Jansen, Marq en Baroeul (FR); Zeinab Takbiri, St. Louis Park, MN (US)

(73) Assignee: Cargill, Incorporated, Wayzata, MN (US)

( * ) Notice: Subject to any disclaimer, the term of this patent is extended or adjusted under 35 U.S.C. 154(b) by 820 days.

(21) Appl. No.: 17/999,739

(22) PCT Filed: May 26, 2021

(86) PCT No.: PCT/US2021/034202
§ 371 (c)(1),
(2) Date: Nov. 23, 2022

(87) PCT Pub. No.: WO2021/242824
PCT Pub. Date: Dec. 2, 2021

(65)              Prior Publication Data
US 2023/0172167 A1        Jun. 8, 2023

Related U.S. Application Data

(60) Provisional application No. 63/031,074, filed on May 28, 2020.

(51) Int. Cl.
*A01K 29/00*        (2006.01)
*G06T 7/20*        (2017.01)

(52) U.S. Cl.
CPC .............. *A01K 29/005* (2013.01); *G06T 7/20* (2013.01); *G06T 2207/10016* (2013.01)

(58) Field of Classification Search
CPC ................... A01K 29/005; G06T 7/20; G06T 2207/10016
(Continued)

(56)              References Cited

U.S. PATENT DOCUMENTS

| 8,915,215 | B1* | 12/2014 | Helgeson | ............... | A01K 45/00 119/421 |
| 10,362,769 | B1* | 7/2019 | Kartoun | ................. | G16H 50/70 |
| 2021/0153479 | A1* | 5/2021 | Mindel | .................. | G06V 10/26 |

FOREIGN PATENT DOCUMENTS

| CN | 105894536 A | 8/2016 |
| CN | 108990831 B | 7/2021 |
| WO | 2020003310 W | 1/2020 |

OTHER PUBLICATIONS

Ju Shengtai et al., Video Tracking to Monitor Turkey Welfare, 2020 IEEE Southwest Symposium on Image Analysis and Interpretation, Mar. 29, 2020, pp. 50-53.
(Continued)

*Primary Examiner* — Eric Blount

(57)              ABSTRACT

Various proxies can be used to qualitatively or quantitatively assess welfare of a poultry flock. For example, as shown and described herein, one or more of a video-based monitoring technique or audio-based monitoring technique can be used. Such monitoring can include a video-based (e.g., image based) technique where indicia of movement of individual members of the flock are automatically tracked. In addition, or instead, an audio-based technique can be used, such as for classification of vocalization. Various metrics can be stored or reported using such techniques and one or more alerts can be generated, such as indicative of flock welfare or a change in flock welfare. Techniques described herein can include identifying paths traversed by respective members of a flock (e.g., individual animals), and then extracting indications such as corresponding to a distribution of such paths. Such
(Continued)

paths can be defined by corresponding movement trajectories associated with individual members.

43 Claims, 8 Drawing Sheets

(58) Field of Classification Search
USPC ........................................................ 340/573.1
See application file for complete search history.

(56) References Cited

OTHER PUBLICATIONS

Marian Stamp Dawkins et al., Optical Flow, Flock Behaviour and Chicken Welfare, Animal Behaviour, Baillier Tindall, London, GB, vol. 84, No. 1, Apr. 17, 2012, pp. 219-223.
Sergeant D. et al., Computer Visual Tracking of Poultry, Computers and Electronics in Agriculture, vol. 21, No. 1, Sep. 1998, pp. 1-18.

* cited by examiner

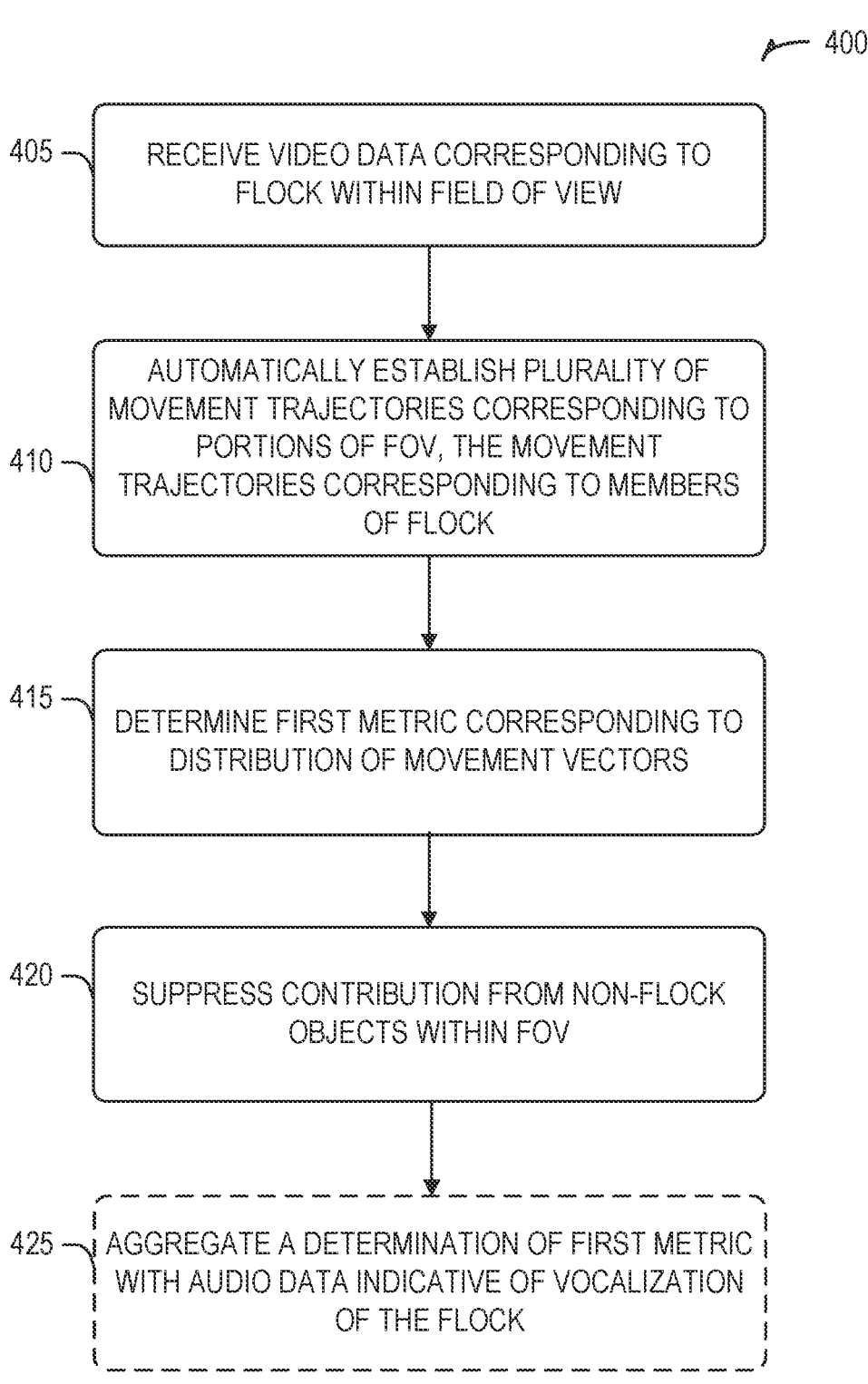

400

405 — RECEIVE VIDEO DATA CORRESPONDING TO FLOCK WITHIN FIELD OF VIEW

410 — AUTOMATICALLY ESTABLISH PLURALITY OF MOVEMENT TRAJECTORIES CORRESPONDING TO PORTIONS OF FOV, THE MOVEMENT TRAJECTORIES CORRESPONDING TO MEMBERS OF FLOCK

415 — DETERMINE FIRST METRIC CORRESPONDING TO DISTRIBUTION OF MOVEMENT VECTORS

420 — SUPPRESS CONTRIBUTION FROM NON-FLOCK OBJECTS WITHIN FOV

425 — AGGREGATE A DETERMINATION OF FIRST METRIC WITH AUDIO DATA INDICATIVE OF VOCALIZATION OF THE FLOCK

FIG. 4

AUTOMATED POULTRY OR LIVESTOCK WELFARE TRACKING

CROSS-REFERENCE TO RELATED APPLICATIONS

This application is a national phase application of PCT Application No. PCT/US2021/034202, filed May 26, 2021, which claims the benefit of U.S. Provisional Application No. 63/031,074, filed May 28, 2020, each of which is incorporated by reference herein in its entirety.

FIELD OF THE DISCLOSURE

This document pertains generally, but not by way of limitation, to automated techniques for characterizing health or well-being (e.g., "welfare") of livestock or poultry, and more particularly to monitoring one or more of audio or video data to extract indications of such welfare.

BACKGROUND

Poultry reared for meat production, particularly broiler chickens, may be raised and housed in barn facilities or other confinement until mature. Generally, chicks are born in a hatchery facility and may then be transferred promptly to a grow-out facility. The grow-out facility generally provides control over the environment for the chickens, such as having a controlled temperature, controlled food delivery, controlled water delivery, controlled lighting, and protocols for replacement or clean-up of litter. Welfare of a flock may be impacted by factors such as litter condition. Various techniques can be used to monitor facility conditions, such as by monitoring ammonia levels, for example. Flock welfare during maturation is important for several reasons, including maintaining humane conditions (e.g., minimizing distress or suffering), maintaining production of mature broilers, and inhibiting spread of poultry-borne illness, as illustrative examples.

SUMMARY OF THE DISCLOSURE

The present inventors have recognized, among other things, that monitoring of flock welfare, such as within a grow-out facility, can present various challenges. For example, a grow-out facility may house thousands or tens of thousands of broiler chickens. Detection of deteriorating welfare may involve atmospheric monitoring or manual sample-based approaches to check for dermatitis or lesions, such as indicative of deteriorating litter conditions or disease. Such approaches may be labor intensive or may otherwise fail to detect early evidence of deteriorating welfare. Accordingly, a technical challenge recognized by the inventors, among other challenges, is that generally-available monitoring approaches may fail to provide timely flock welfare data, particularly early (e.g., leading) detection of declining welfare.

The present inventors have also recognized, among other things, that various proxies can be used to qualitatively or quantitatively assess welfare of a poultry flock. For example, as shown and described herein, one or more of a video-based monitoring technique or audio-based monitoring technique can be used. Such monitoring can include a video-based (e.g., image based) technique where indicia of movement of individual members of the flock are automatically tracked. In addition, or instead, an audio-based technique can be used, such as for classification of vocalization. Various metrics can be stored or reported using such techniques, and in an example, one or more alerts can be generated, such as indicative of flock welfare or a change in flock welfare.

The inventors have established, among other things, a technique that can include identifying paths (e.g., trajectories) traversed by respective members of a flock (e.g., individual chickens), and then extracting indications such as corresponding to a distribution of such paths, or corresponding to a distribution of flock member locations, or both. Such paths can be defined by corresponding movement vectors associated with individual members of the flock. A model-based or machine-learning approach can be used to characterize relationships between the extracted indications and welfare indicators.

In an example, such as corresponding to a machine-implemented technique, a method for assessing poultry or livestock welfare can include receiving video data corresponding to at least a portion of a flock within a field of view, using the received video data, automatically establishing a plurality of movement trajectories corresponding to respective portions of the field of view, the movement trajectories corresponding to tracked individual members of the flock, and automatically determining a first metric corresponding to a distribution of the movement trajectories, where determining the plurality of movement trajectories corresponding to respective portions of the field of view includes suppressing a contribution from non-flock objects within the field of view.

Optionally, the technique can include determining a plurality of such movement trajectories comprising groups of trajectories corresponding to paths taken by tracked individual members of the flock. In an example, the technique can include receiving audio data corresponding to another portion of the flock, and identifying flock-related vocalizations in the received audio data. For example, the technique can include automatically classifying the respective vocalizations as to whether the respective vocalizations indicate comfort or distress.

In an example, one or more techniques as shown and described herein can be implemented in a system for assessing livestock welfare, such as a system comprising an audio processor circuit coupled to a directional microphone, the directional microphone oriented to receive sound generated by a flock, a video processor circuit coupled to a downward-facing imaging device arranged to image the flock, a processor circuit coupled to the video processor circuit and the audio processor circuit or included as a portion of at least one of the video processor circuit or the audio processor circuit, and memory circuit communicatively coupled to the processor circuit. In such an example, the processor circuit is configured to receive instructions stored using the memory circuit, the instructions, when executed, causing the processor circuit to receive video data from the video processor circuit, the video data corresponding to at least a portion of the flock within a field of view of the downward-facing imaging device, using the received video data, automatically establish a plurality of movement trajectories corresponding to respective portions of the field of view, the movement trajectories corresponding to tracked individual members of the flock, and automatically determine a first metric corresponding to a distribution of the movement trajectories, where the determining the plurality of movement trajectories corresponding to respective portions of the field of view includes suppressing a contribution from non-flock objects within the field of view.

While the examples herein relate to poultry, and without being bound by theory, the techniques described herein are believed generally applicable to other livestock such as hogs. This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates generally a technique, such as a machine-implemented method, such as can be used to establish movement trajectories corresponding to individually-tracked members of a flock within a field of view of an imaging system.

DETAILED DESCRIPTION

As mentioned above, livestock or poultry can be monitored such as using digital video or digital audio capture, or both, such as to evaluate flock behavior in an automated manner to extract indications of welfare. Such monitoring can include motion tracking of individual members of the flock. In addition, or instead, such monitoring can include identification and classification of flock vocalization. A processing node, such as an embedded processing system can provide edge-computing capability to implement one or more processing techniques for motion tracking or flock vocalization on-site at a livestock or poultry facility, such as on-site or within a grow-out facility.

Figure 1:
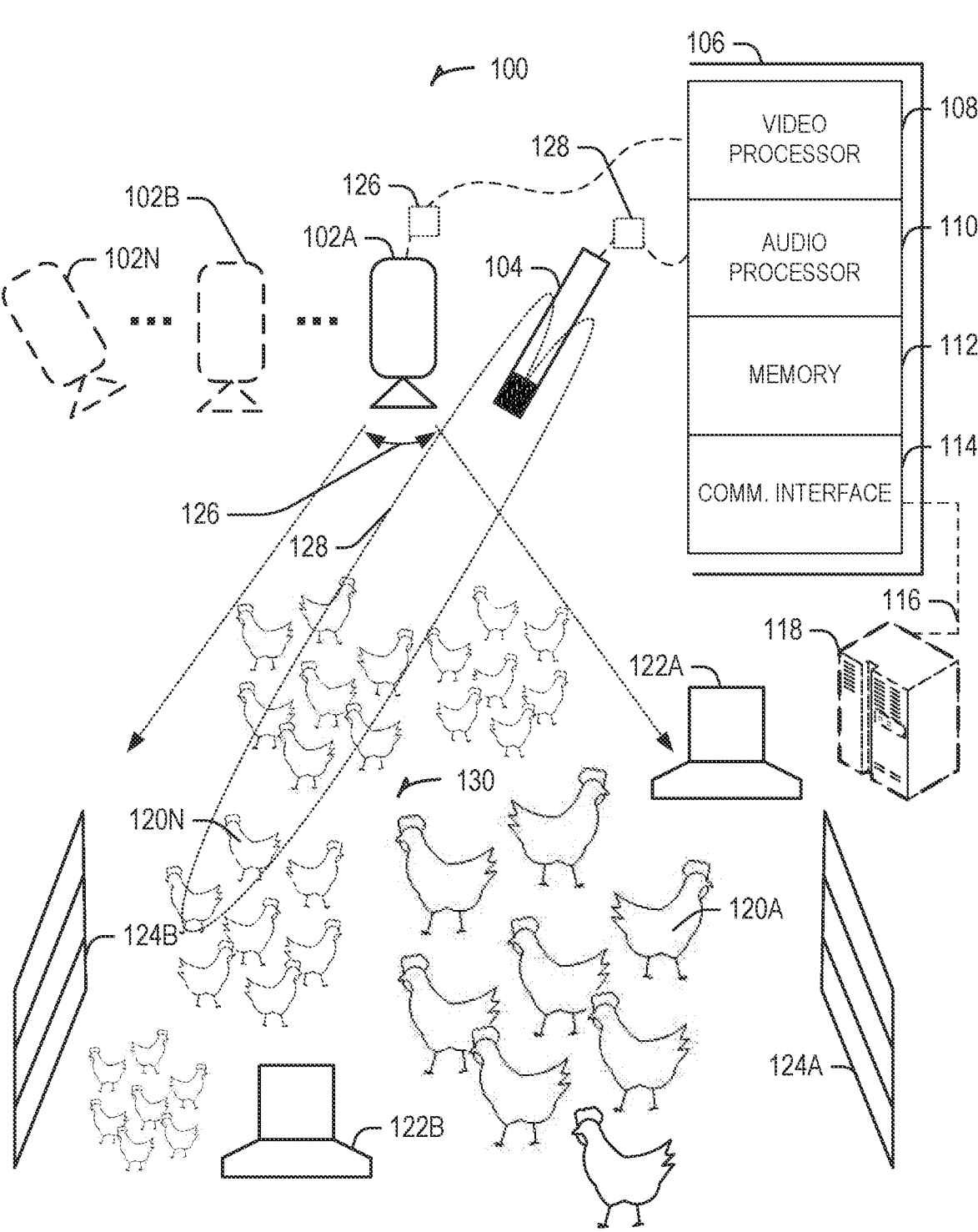
FIG. 1 illustrates generally an example comprising a system, such as can include one or more video capture or audio capture devices, such as can be coupled to an edge-computing node to provide data indicative of at least a portion of a flock under observation.

FIG. 1 illustrates generally an example comprising a system 100, such as can include one or more video capture or audio capture devices, such as can be coupled to an edge-computing node or other processing system to provide data indicative of at least a portion of a flock 130 under observation. The system 100 can include at least one video-capture device such as a digital camera 102A or other downward-facing imaging device, or a group of cameras 102A, 102B, through 102N, to image respective portions or entireties of the flock 130. The system 100 can include an in-line processor 126, such as to digitize and transmit data indicative of video (e.g., a series of digitally-encoded images) or an amplified analog video signal to a video processor circuit 108, such as included as a portion of an embedded data processing system 106. In an example, the in-line processor 126 provides amplification and signal conditioning to transmit a video signal or digital data representative thereof over a distance of over 1, 10, 100, or several hundred meters to the video processor circuit 108. The video processor circuit 108 can include one or more application-specific or general-purpose processor circuits, such as to perform one or more techniques for characterizing motion of members of a flock as generally shown and described herein. For example, instructions stored in a memory circuit 112 can be executed to perform a technique as shown and described herein.

Generally, the video signals can include one or more of color (e.g., RGB) or single-channel (e.g., black-and-white or monochrome) video, or a sequence of images corresponding to such a video signal (e.g., frame grabs or static images obtained using the digital camera 102A) Imaging data obtained from the camera 102A or other cameras can define a corresponding scene, such as a scene defined by a field of view 126 of the camera 102A. Techniques shown and described herein can be used to identify individual members 120A through 120N of the flock 130, while suppressing or inhibiting an error contribution from non-flock objects such as feeders 122A or 122B or confinement boundaries 124A or 124B, such as wall, partition, or fence regions.

In addition, or instead, the system 100 can include an audio capture device such as a directional microphone 104. The directional microphone 104 can be one amongst a plurality of such microphones. The directional microphone 104 can include a cardioid, supercardioid, or lobar pickup pattern (e.g., a directional spatial response defining a field of capture 128 in a specified direction relative to the directional microphone 104), as illustrative examples. The directional microphone 104 can be coupled to an audio processor circuit 110, such as through an in-line processor 128. The in-line processor 128 can one or more of digitize, amplify, or filter an audio signal provided by the directional microphone 104, such as to transmit an audio signal or digital data representative thereof over a distance of 1, 10, 100, or several meters to the audio processor circuit 110. The audio processor circuit 110 can include one or more application-specific or general-purpose processor circuits, such as to perform one or more techniques for characterizing vocalizations from a flock as generally shown and described herein. For example, instructions stored in a memory circuit 112 can be executed to perform a technique as shown and described herein. While the example of FIG. 1 illustrates a video processor circuit 108 and link to camera 102A that is separate from an audio processor circuit 110 and link to the directional microphone 104, the communicative coupling (e.g., a wired or wireless link) can be combined to transmit or receive video and audio data contemporaneously, such as using a wired or wireless digital network and encoding of audio or video information at the source (e.g., at or nearby camera 102A or the directional microphone 104).

While the examples above mention one or more of video processing or audio processing performed using the embedded data processing system 106, such processing can be performed in whole or in part using another system such as a separate on-site or remotely-located compute resource 118, such as communicatively coupled through a wired or wireless link 116 to a communication interface 114 included as a portion of the embedded data processing system 106. For example, instantiation, training, or refinement of a machine-learning or other model used to perform video processing or audio processing can be performed in coordination between the embedded data processing system 106 and the compute resource 118. As an illustrative example, the compute resource 118 can be an instance of processing capability or a model repository made available by a cloud provider, such the compute resource 118 need not correspond to a single physical server or other hardware at a single site.

As an illustrative example, the camera 102A can provide 1920×1080 pixel resolution with 15 frames per second encoded using AVI encoding. The link between the camera 102A and the embedded data processing system 106 can include a Local Area Network (LAN). In this example, audio streams from the microphone 104 can be recorded in 15 minute segments and compressed in MP3 format. As an illustrative example, such during or after a flock growth cycle, data can be saved in the cloud and analytics can be performed using the compute resource 118.

Figure 2A:
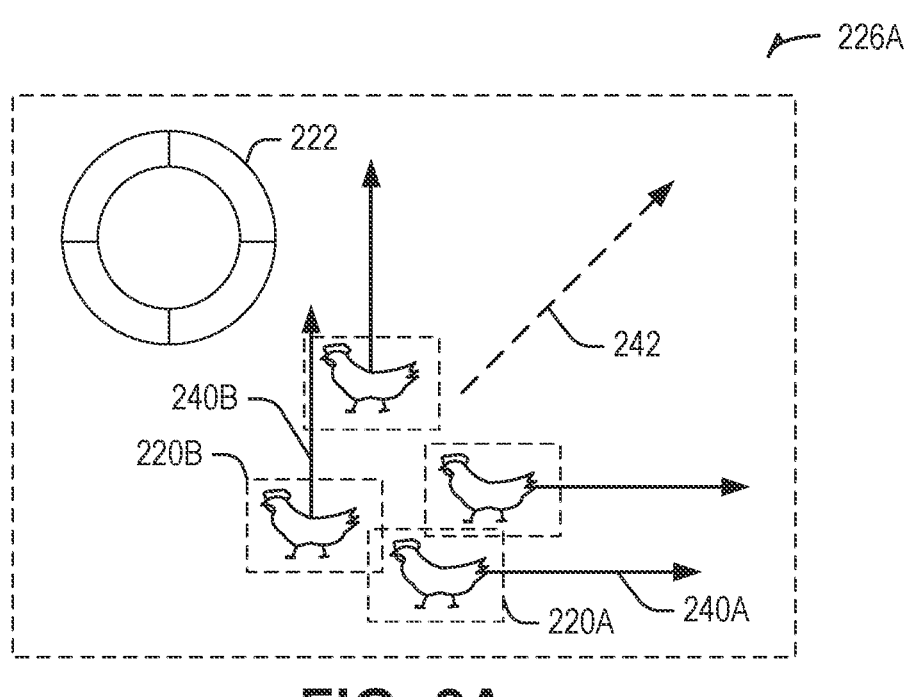
FIG. 2A illustrates generally an example comprising a scene, such as corresponding to a field of view captured by a digital camera, including movement vectors corresponding to movement of individual flock members.
Figure 3A:
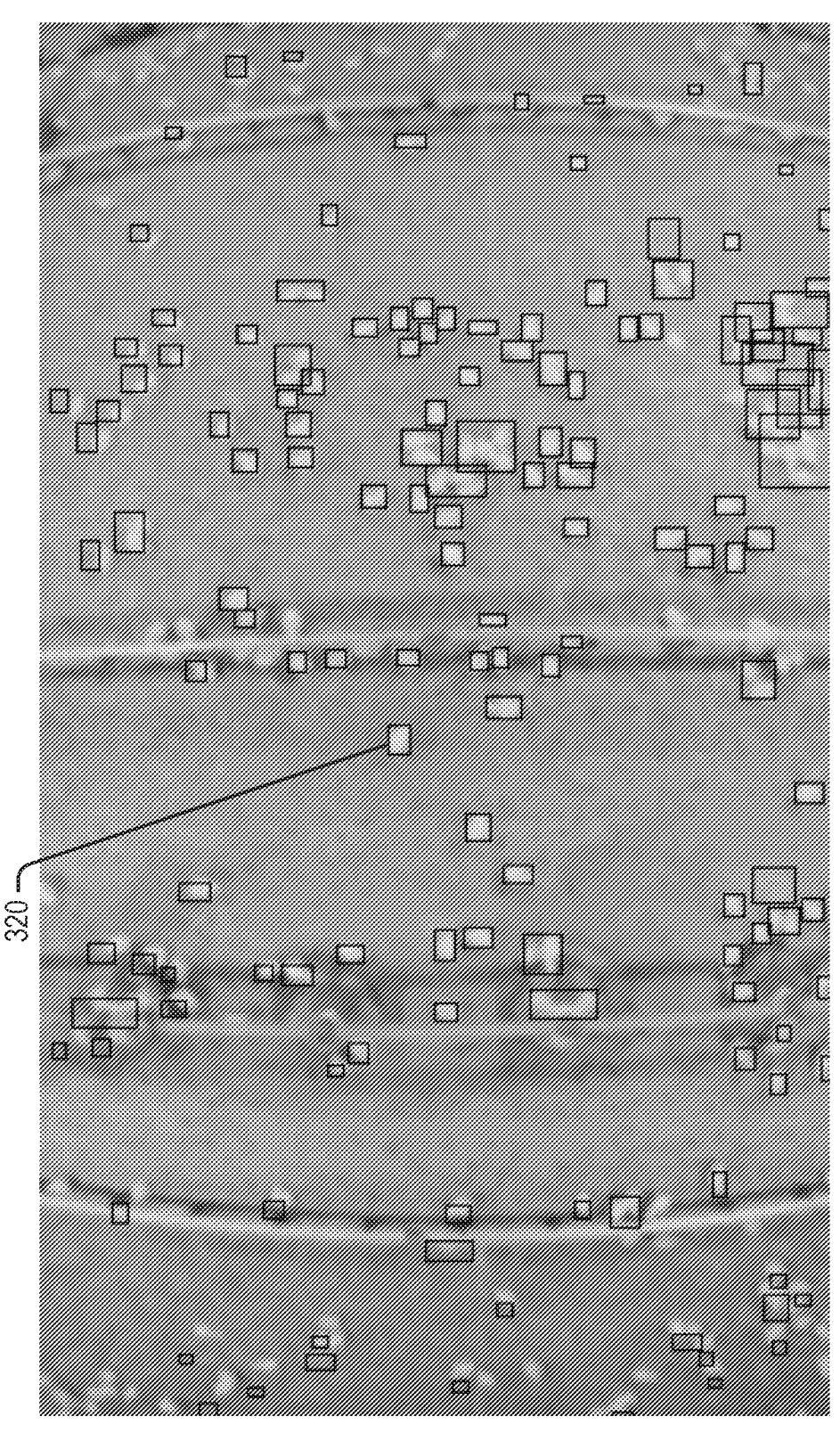
FIG. 3A shows an illustrative example comprising a scene, such as corresponding to a field of view captured by a digital camera, including broiler chickens that have been identified, such as for purposes of establishing a count of chickens or separating chickens from other features shown in the scene.

FIG. 2A illustrates generally an example comprising a scene 226A, such as corresponding to a field of view captured by a digital camera, including movement vectors corresponding to movement of individual flock members. In the example of FIG. 2A, such as can correspond to a processing technique implemented in whole or in part using the system 100 of FIG. 1, individual members of a flock (e.g., individual chickens 220A and 220B) can be identified. Such identification can include use of various image segmentation techniques, such as a technique implemented using a machine-learning approach (e.g., a convolutional neural network), or using other techniques such as a blob-based technique (e.g., identifying a pixel group corresponding to an individual member of the flock based on adjacent pixels having similar characteristics). FIG. 3A shows an illustrative example of an output of a technique for identifying members, showing boxes placed automatically around identified members. Referring back to FIG. 2A, once individual members have been identified, movement vectors can be determined, such as by processing respective images in a series of images from captured video data, or using other techniques. For example, in one approach, an optical flow technique can be used in combination with individual member tracking data, such as to establish movement vectors or to otherwise define trajectories that can be associated with individual members of the flock. As shown in FIG. 2A, a first broiler chicken 220A can be identified, and a corresponding movement vector 240A (or related trajectory) can be established from video data. A second broiler chicken 220B can be identified, and a corresponding movement vector (or related trajectory) can be identified. A series of movement vectors or related trajectories can be identified, such as corresponding to all or substantially all of the members of the flock within the scene 226A.

Data indicative of a distribution of movement vectors or related trajectories can be determined, such as descriptive statistics corresponding to behavior of a group members of the flock (e.g., a vector sum 242 of movement vectors or related trajectories, a derivative of a sequence of movement vectors or related trajectories indicating a velocity, a variance of movement vectors or related trajectories, or a central tendency such as an average magnitude, average direction, median magnitude, or median direction). By contrast with purely optical-flow-based techniques where individual members are not identified, the techniques described herein can accommodate more complex path geometries, and can suppress contributions from non-flock objects such as a feeder 222 as shown in FIG. 2A.

Figure 2B:
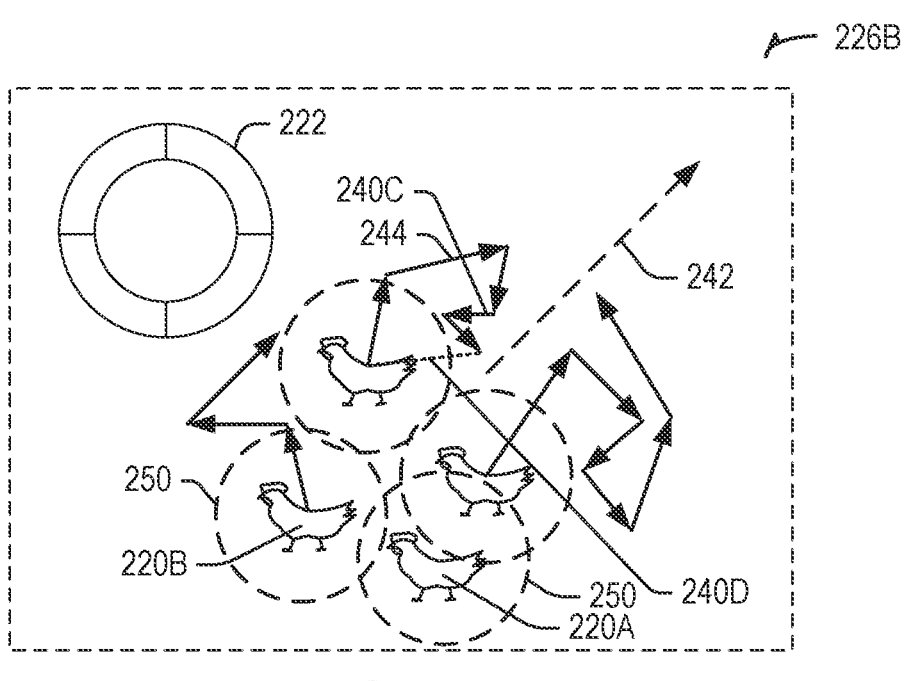
FIG. 2B illustrates generally an example comprising a scene, such as corresponding to a field of view captured by a digital camera, including paths defined by corresponding groups of movement vectors, the paths corresponding to movement of individual flock members.

FIG. 2B illustrates generally an example comprising a scene 226B, such as corresponding to a field of view captured by a digital camera, including paths (e.g., trajectories) defined by corresponding groups of movement vectors, the paths corresponding to movement of individual flock members. As in FIG. 2A, in FIG. 2B, individual members of a flock can be identified, such as broiler chickens 220A and 220B. Paths such as a trajectory 244 can be established by aggregating motion vectors such as a motion vector 240C, and paths can be associated with corresponding members of the flock. As in FIG. 2A, data indicative of a distribution of movement vectors or related trajectories can be determined, such as descriptive statistics corresponding to behavior of a group members of the flock (e.g., a vector sum 242 of movement vectors or trajectories, a variance, or other central tendency).

A metric corresponding to such a distribution can be determined. Illustrative examples of such a metric can include a degree of movement of the flock. For example, such a degree of movement can include determining a relative indication such as a proportion of the flock moving a specified distance or in a specified direction per a specified duration (e.g., 80% of the flock moved a specified total distance during a specified duration or met a specified movement uniformity criterion relating to movement direction or magnitude, or both). For example, a metric can include comparing movements or paths corresponding to individual members of the flock against a specified threshold, such as a relative movement threshold shown graphically in FIG. 2B as a ring 250 around an initial or other specified location of member broiler chickens 220A or 220B, to determine a distribution or value for reporting or alerting, or to identify stationary members. For example, if a specified proportion of broiler chickens in the scene 226B failed to exceed the threshold 250 during a specified unit of time, an alert can be generated, or a proportion of such flock members can be tracked for trending.

In the illustrative example of FIG. 2B, the threshold 250 can be established such as using prior movement data or prior studies, and three out of the four broiler chickens has moved beyond the ring 250 defining the threshold. In another example, three out of the four broiler chickens may have moved a total path length (or a net path length 240D) greater than a specified threshold. In yet another example, three out of four of the broiler chickens shown in FIG. 2B have moved in a net direction providing a positive dot product relative to the vector 242 aggregating the movement vectors or related trajectories. Use of a threshold is illustrative, and other criteria can be used to either provide metrics indicative of welfare or to assist in assessing or controlling environmental parameters. As an illustration, label data can be established such as using machine learning techniques applied to ensembles of movement vector data or trajectory data. For example, a deep learning model such as a convolutional neural network can be established to correlate a generalized welfare assessment or specific welfare indicators with acquired movement vector or trajectory data, such as including labeling respective ones of paths corresponding to individual members as indicative of one or more of a healthy gait, an unhealthy gait, a health range of motion, an unhealthy range of motion, or a score relating one or more such attributes. In an example, a value of a metric or a population of such values can be used to establish a determination that a flock is exhibiting evidence of one or more of foot or other lesions, sickness, or infection, as illustrative examples.

In yet another example, one or more of a machine learning model instance, a threshold, a selected metric, or other parameter used for making a welfare determination is adjusted or otherwise established in response to one or more of data indicative of a location of monitoring, or an environmental parameter. In this manner, site-specific models, thresholds, or metrics can be established, such as in response to differences in site configuration, broiler behavior, or environmental condition. For example, one or more models or thresholds could be seasonally adjusted, temperature adjusted, adjusted in response to whether ventilation is active, adjusted diurnally, adjusted in response to light level, or based on other attributes such as broiler chicken source (e.g. hatchery) or geographic attributes, as illustrative examples. In another example, one or more models or thresholds can be adjusted in relation to a growth phase of the flock.

Figure 2C:
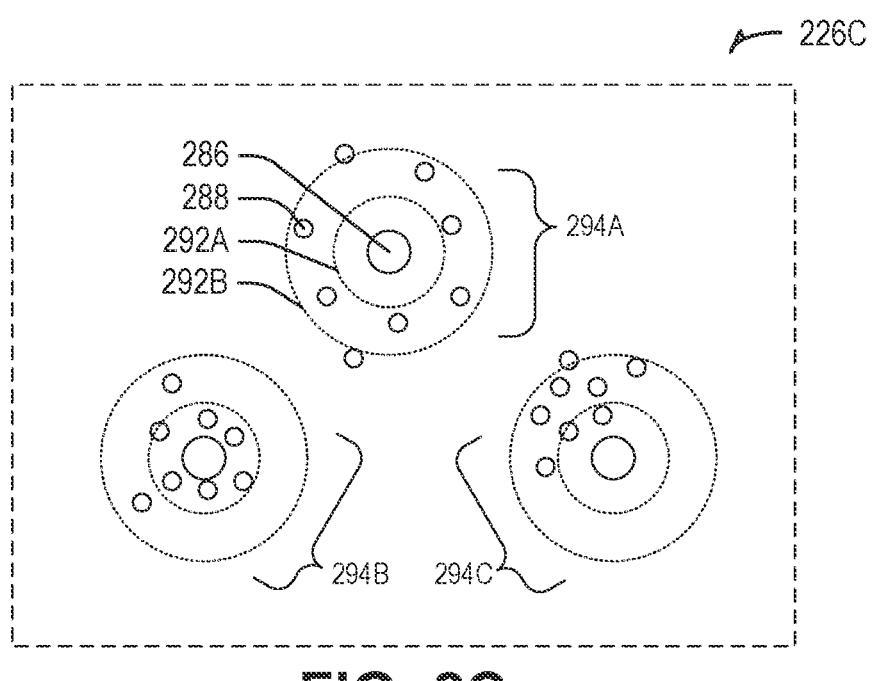
FIG. 2C illustrates generally an example comprising a scene, such as corresponding to a field of view captured by a digital camera, showing different spatial distributions of members of a flock, such as can be used to provide an indication of one or more of flock health or environmental status.

As yet another example, FIG. 2C illustrates generally an example comprising a scene 226B, such as corresponding to a field of view captured by a digital camera, showing different spatial distributions of members of a flock, such as can be used to provide an indication of one or more of flock health or environmental status. For example, movement data can provide indicia of a spatial distribution of flock members either in a relative sense with respect to each other, or in an absolute sense within a field of view or larger areas. For example, data indicative of a spatial distribution can provide an indication of distances between flock members or between a group of flock members and a central location (e.g., a brooder). For example, in FIG. 2C, a first distribution 294A shows flock members such as a member 288 spaced apart from a central location 286 and from each other. For example, an average distance between members such as the member 288 and the central location 286 being greater than a magnitude indicated by a radius 292 may provide an indication concerning environmental status. For example, if an average distance between the outer members and the central location 286 falls within a specified range defined by limits 292A and 292B (or some other criteria), the temperature within the environment housing the flock can be considered nominal. By contrast, tight clustering as shown in FIG. 294B may indicate that the temperature in the environment is too low. Clustering in a particular region or direction such as shown in the example of FIG. 294C may indicate one or more of a presence of a draft, a presence of undesirable lighting, or an uneven temperature across the environment (e.g., relatively warmer in some spots and relatively cooler in others). The example of FIG. 2C shows a central location 286 in each of the examples of the distributions 294A, 294B, and 294C, but such techniques could also be performed using other metrics such as an average distance between flock members without requiring a central "hub" or other object at the center of the field of view. For example, the central location 286 can correspond to a brooder or coop radiant heater.

Identification and tracking of individual flock members facilitates analysis performed in relation to a population of flock members rather than just a scene having fixed pixel blocks (as would result from using an optical flow technique lacking individual tracking). Inferences or other determinations concerning flock health can then be made relative to the population of individually-tracked members in a scene rather than arbitrary fixed groups of pixels having fixed dimensions. FIG. 3A shows an illustrative example comprising a scene, such as corresponding to a field of view captured by a digital camera, including broiler chickens that have been identified, such as for purposes of establishing a count of chickens or separating chickens from other features shown in the scene. In FIG. 3A, a downward-facing camera may be arranged to provide a near vertical orientation (such that a longitudinal axis of the center of the camera field of view is almost or entirely straight up-and-down). At a periphery of the image, identification of members of the flock can take into consideration image distortion and scaling effects, as shown in FIG. 3A. As shown in FIG. 3A, a substantial proportion of members can be identified, such as comprising over half, over three quarters, over ninety percent, or over ninety-five percent of the chickens within the field-of-view defining the scene, as illustrative examples. Locations of identified members are indicated graphically in FIG. 3A by a box, such as corresponding to a broiler chicken 320. Identification of flock members as shown in FIG. 3A can be performed to support further determination of movement vectors or related trajectories corresponding to tracked individual members of the flock. Such an approach also allows determination of an estimated count of members within the scene, such as for use in other analysis.

Figure 3B:
FIG. 3B shows an illustrative example comprising a scene, such as corresponding to a field of view captured by a digital camera, including broiler chickens that have been tracked to establish movement paths corresponding to individual broiler chickens.
Figure 3C:
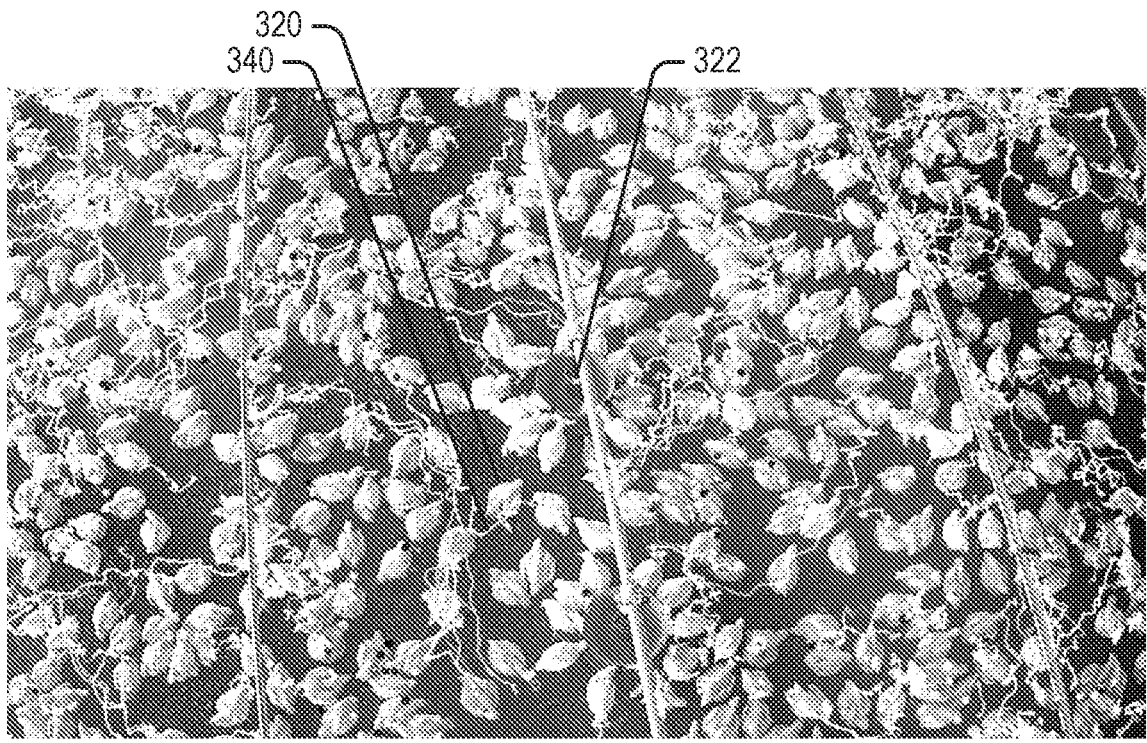
FIG. 3C shows yet another illustrative example comprising a scene, such as corresponding to a field of view captured by a digital camera, including broiler chickens that have been tracked to establish movement paths corresponding to individual broiler chickens.

FIG. 3B shows an illustrative example comprising a scene, such as corresponding to a field of view captured by a digital camera, including broiler chickens that have been tracked to establish movement paths corresponding to individual broiler chickens and FIG. 3C shows yet another illustrative example comprising a scene, such as corresponding to a field of view captured by a digital camera, including broiler chickens that have been tracked to establish movement paths corresponding to individual broiler chickens. For example, in FIG. 3B and FIG. 3C, paths comprising groups of detected movements are shown as jagged lines in various shades, the respective shades corresponding to different individual tracked members. For example, in FIG. 3C, a line 340 graphically illustrates a determined group of movements corresponding to a member 320 of the flock. A feeder 322 is not counted, and according to techniques described herein, would not be identified incorrectly as a stationary member of the flock. Instead, a contribution from the feeder 322 can be suppressed so as to avoid confounding assessments related to the population of members of the flock. For example, a background subtraction technique can be used such as can be instantiated using commodity hardware processing circuitry (e.g., implemented on an ARM architecture, or other architecture, such as without requiring a high-performance graphical processing unit). The background subtraction can help to suppress or eliminate a contribution from non-flock objects. As an illustrative example, BackgroundSubtractorCNT can be used, which can be called using an Application Programming Interface (API) similar to background subtraction techniques included in the OpenCV_contrib (OpenCV is available from OpenCV.org, and OpenCV_contrib, a repository for OpenCV's extra modules, can be accessed at https://github.com/opencv/opencv_contrib). Such a motion tracking technique can provide a mask such as indicative of "foreground" portions of a field of view that can be processed using one or more of backgrounds in multiple consecutive time frames. Other background subtraction techniques include the native OpenCV background subtraction, or a Gaussian Mixture Model (e.g., Mixture of Gaussians or MoGs technique). Movement tracking can be performed using a variety of different techniques. For example, one or more techniques can be used such as including a dense optical flow approach, or a corner detection approach (e.g., a "Shi-Tomasi" corner detector such as implemented as a portion of the OpenCV library). For embedded implementation, BackgroundSubtractorCNT outperformed other techniques mentioned above for the purpose of chicken movement detections for deriving welfare indications, in terms of execution time and memory use efficiency.

Generally, the approaches in this document refer deriving welfare indications from movement data from individually-tracked flock members, such as in the form of movement vectors or trajectories relating to member movements. Derivatives of sequences of such vectors or trajectories can also be used, such as indicative of velocity, acceleration, jerk, or the like. Groups of trajectories corresponding to groups of tracked members can be evaluated statistically, such as using moments or other measures (centroid, centroid movement, average movement distance or average movement direction, variance of any of the aforementioned, skewness of the aforementioned, or the like). Ensembles of such sets can be used for establishing machine-learning models.

Figure 6:
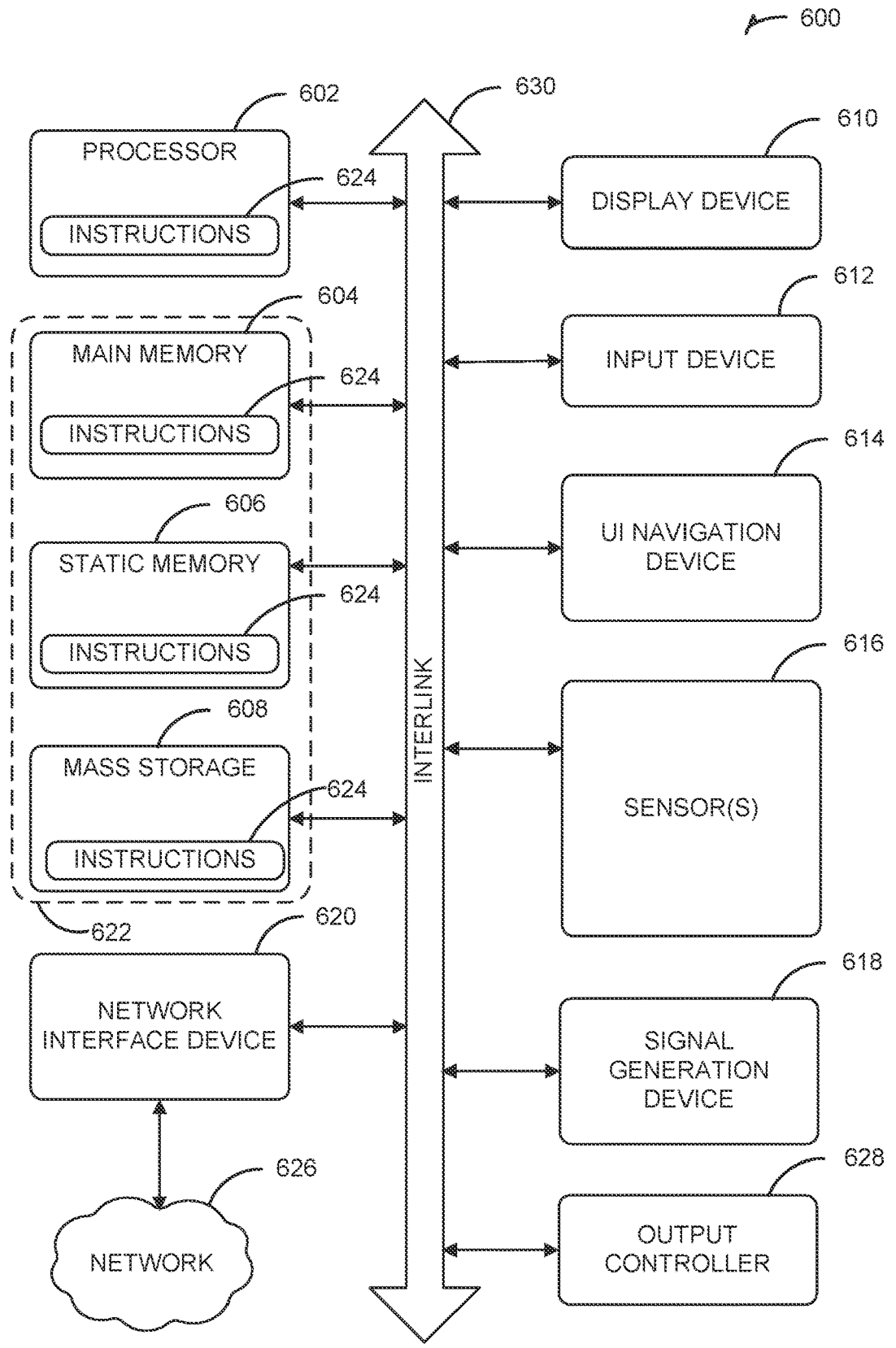
FIG. 6 illustrates a block diagram of an example comprising a machine upon which any one or more of the techniques (e.g., methodologies) discussed herein may be performed.

FIG. 4 illustrates generally a technique 400, such as a machine-implemented method, such as can be used to establish movement trajectories corresponding to individually-tracked members of a flock within a field of view of an imaging system. The technique 400 can be performed using a portion or an entirety of a system 100 as shown in FIG. 1, such as implemented using a portion or an entirety of a machine 600 as shown in FIG. 6. In the example of FIG. 4, at 405, video data can received corresponding to at least a portion of a flock, such as within a field of view (FOV) defining a scene. The video data can include a series of images captured using a digital imaging device, such as a downward-facing camera as shown and described elsewhere herein. At 410, a plurality of movement trajectories can be established, such as corresponding to respective portions of the field of vice, the movement trajectories corresponding to tracked individual members of the flock. At 420, contributions from non-flock objects can be suppressed, such as before, during, or after establishing the plurality of movement trajectories at 410. At 415, a metric can be determined, such as corresponding to a distribution of movement trajectories. Illustrative examples of such metrics are discussed elsewhere herein, such as above in relation to FIG. 2A and FIG. 2B, as illustrative examples. In an example, at 425, a determination of a first metric can be aggregated with audio data indicative of vocalization. For example, a determination of the first metric can be weighted using a separate determination from audio data. As an illustrative example, if the first metric or a distribution of first metrics indicates declining welfare, the audio data can be used as a cross-check or to weight the determination of declining welfare (e.g., no distress vocalizations detected, or audio indicates comfort vocalizations).

Figure 5:
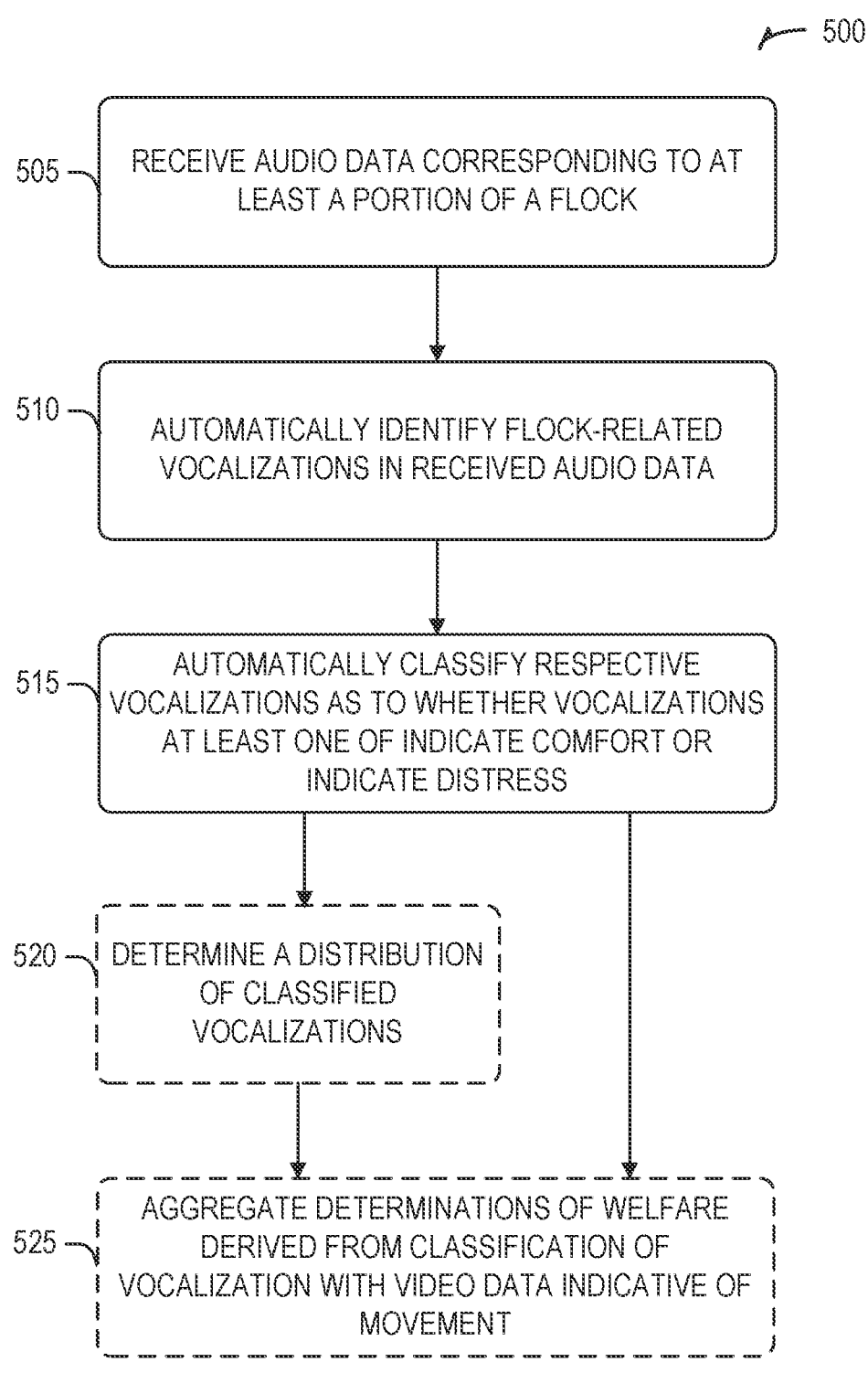
FIG. 5 illustrates generally a technique, such as a machine-implemented method, such as can be used to identify and classify flock-related vocalizations.

FIG. 5 illustrates generally a technique 500, such as a machine-implemented method, such as can be used to identify and classify flock-related vocalizations. As discussed elsewhere herein, indicators of movement of a flock may provide opportunities for automated determinations of flock welfare. For example, high levels of variation in flock cohesion or movement uniformity, or prolonged stationary periods, may indicate poor leg health or otherwise compromised walking ability, or even disease. As mentioned elsewhere herein, use of audio monitoring, either alone or in combination with video-based monitoring, may provide indication of flock welfare. At 505, audio data can be received corresponding to at least a portion of a flock, such as a portion of a flock being visually monitored according to the technique 400 of FIG. 4 or other techniques described herein.

At 510, flock-related vocalizations can be identified in the audio data. For example, the audio data can be segmented into respective records, and flock-related vocalizations can be identified in some or all of the respective records, such as spanning a growth cycle or other specified duration. At 515, respective identified vocalizations can be classified, such as to indicate whether such vocalizations indicate distress. Similarly, respective identified vocalizations can be classified, such as to indicate whether such vocalizations indicate comfort. According to various examples, identification or classification of vocalizations can be performed using analysis of a feature from the received audio data, such as frequency-domain profile or temporal profile representative of amplitude, energy, or power. In an example, classification can be performed by correlating an identified vocalization or features corresponding thereto with a stored profile. A metric can be established, such as corresponding to a correlation result. In an example, a machine-learning model can be trained to label an audio stream in manner indicative of a classified vocalization, and an instance of the trained model can be applied to label a vocalization. Such approaches mentioned above can be used to distinguish different chicken vocalizations and classify such vocalizations into the expression of 'pleasure notes,' indicating comfort and good health or 'distress calls,' indicating fear, pain, or discomfort. Other classifications extending beyond one of comfort, one of distress, or one of comfort or distress can be used. At 520, a distribution of such vocalizations can be determined, such as versus time. A count of instances of a specified class of vocalization can be determined, such as over a specified duration of time or per unit of time, as an illustrative examples. Such vocalizations can be indicative of welfare. As a cross-check, or to enhance sensitivity, specificity, positive predictive value, or negative predictive value, at 525 determinations of welfare derived from classification of flock vocalizations can be aggregated with video data indicative of movement, as mentioned above in relation to FIG. 4.

FIG. 6 illustrates a block diagram of an example comprising a machine 600 upon which any one or more of the techniques (e.g., methodologies) discussed herein may be performed. In various examples, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed)

network environment. The machine 600 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Each of the non-limiting aspects above can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for assessing poultry or livestock welfare, comprising:
   receiving video data corresponding to at least a portion of a flock within a field of view;
   using the received video data, automatically establishing a plurality of movement trajectories corresponding to respective portions of the field of view, the movement trajectories corresponding to tracked individual members of the flock; and
automatically determining a first metric corresponding to a distribution of the movement trajectories including a degree of uniformity of movement of the flock;
wherein the determining the plurality of movement trajectories corresponding to respective portions of the field of view includes suppressing a contribution from non-flock objects within the field of view.

2. The method of claim 1, wherein the plurality of movement trajectories includes groups of trajectories corresponding to paths taken by tracked individual members of the flock.

3. The method of claim 1, wherein the first metric corresponds to a degree of movement of the flock; and
   wherein the degree of movement comprises a relative indication of a proportion of the flock that have moved over a specified duration or versus a prior movement determination.

4. The method of claim 1, comprising determining a welfare indicator using the first metric or a value indicative of a population of first metrics.

5. The method of claim 4, wherein the welfare indicator comprises a determination that the flock is exhibiting evidence of foot lesions.

6. The method of claim 4, wherein the welfare indicator comprises a determination that the flock is experiencing incidence of sickness or infection.

7. The method of claim 1, comprising comparing the first metric or a value indicative of a population of first metrics to a threshold; and
   in response, triggering an alert when the first metric traverses the threshold.

8. The method of claim 7, wherein the threshold is established in response to one or more of data indicative of (1) an absolute spatial distribution of flock members or (2) a relative distribution of flock members with respect to each other.

9. The method of claim 7, wherein the first metric is used to monitor or adjust an environmental parameter that includes one or more of light level, temperature, or ventilation state.

10. The method of claim 1, wherein substantially all individual members of the flock have associated movement trajectories within the field of view.

11. The method of claim 1, comprising receiving audio data corresponding to another portion of the flock; and identifying flock-related vocalizations in the received audio data.

12. The method of claim 11, comprising automatically classifying respective vocalizations from amongst the identified vocalizations as to whether respective vocalizations indicate distress.

13. The method of claim 12, wherein the automatically classifying the respective vocalizations includes classifying whether the respective vocalizations indicate comfort or distress.

14. The method of claim 12, wherein the automatically classifying the respective vocalizations includes using a second metric indicative of respective vocalizations.

15. The method of claim 14, wherein the automatically classifying the respective vocalizations includes identifying a profile corresponding to at least one of a comfort vocalization or a distress vocalization and correlating a detected vocalization with the profile to provide the second metric.

16. The method of claim 15, wherein the profile comprises a temporal profile.

17. The method of claim 15, wherein the profile comprises a frequency-domain profile.

18. The method of claim 12, wherein the automatically classifying the respective vocalizations includes applying a machine-learning model trained to label an audio stream in manner indicative of a classified vocalization.

19. The method of claim 11, wherein receiving the audio data includes capturing audio using at least one directional microphone.

20. The method of claim 19, wherein the directional microphone has a shotgun receive pattern in a specified plane with a main lobe extending axially from the microphone in a boresight direction.

21. The method of claim 1, wherein the automatically establishing the plurality of movement trajectories and the automatically determining a first metric are performed using an embedded data processing system located at a livestock or poultry site being monitored.

22. The method of claim 21, wherein the embedded data processing system is located on or within a structure housing poultry or livestock.

23. A processor-readable medium comprising instructions that, when performed by at least one processor circuit, cause the processor circuit to perform the method of claim 1.

24. A system for assessing livestock welfare, comprising:

an audio processor circuit coupled to a directional microphone, the directional microphone oriented to receive sound generated by a flock;

a video processor circuit coupled to a downward-facing imaging device arranged to image the flock;

a processor circuit coupled to the video processor circuit and the audio processor circuit or included as a portion of at least one of the video processor circuit or the audio processor circuit; and a memory circuit communicatively coupled to the processor circuit;

wherein the processor circuit is configured to receive instructions stored using the memory circuit, the instructions, when executed, causing the processor circuit to:

receive video data from the video processor circuit, the video data corresponding to at least a portion of the flock within a field of view of the downward-facing imaging device;

using the received video data, automatically establish a plurality of movement trajectories corresponding to respective portions of the field of view, the movement trajectories corresponding to tracked individual members of the flock;

automatically determine a first metric corresponding to a distribution of the movement trajectories including a degree of uniformity of movement of the flock;

wherein the determining the plurality of movement trajectories corresponding to respective portions of the field of view includes suppressing a contribution from non-flock objects within the field of view.

25. The system of claim 24, further comprising the imaging device and the directional microphone.

26. The system of claim 24, wherein the plurality of movement trajectories includes groups of trajectories corresponding to paths taken by tracked individual members of the flock.

27. The system of claim 24, wherein the first metric corresponds to a degree of movement of the flock; and wherein the degree of movement comprises a relative indication of a proportion of the flock that have moved over a specified duration or versus a prior movement determination.

28. The system of claim 24, wherein the instructions, when executed, cause the processor circuit to:

compare the first metric or a value indicative of a population of first metrics to a threshold; and in response, trigger an alert when the first metric traverses the threshold.

29. The system of claim 24, wherein the instructions, when executed, cause the processor circuit to determine a welfare indicator using the first metric or a value indicative of a population of first metrics.

30. The system of claim 29, wherein the welfare indicator comprises a determination that the flock is exhibiting evidence of foot lesions.

31. The system of claim 29, wherein the welfare indicator comprises a determination that the flock is experiencing incidence of sickness or infection.

32. The system of claim 24, wherein the instructions, when executed, cause the processor circuit to compare the first metric or a value indicative of a population of first metrics to a threshold; and in response, to trigger an alert when the first metric traverses the threshold.

33. The system of claim 32, wherein the instructions, when executed, cause the processor circuit to establish the threshold in response to one or more of data indicative of (1) an absolute spatial distribution of flock members or (2) a relative distribution of flock members with respect to each other.

34. The system of claim 32, wherein the first metric is used to monitor or adjust an environmental parameter that includes one or more of light level, temperature, or ventilation state.

35. The system of claim 24, wherein substantially all individual members of the flock have associated movement trajectories within the field of view.

36. The system of claim 24, wherein the instructions, when executed, cause the processor circuit to receive audio data corresponding to another portion of the flock; and identifying flock-related vocalizations in the received audio data.

37. The system of claim 36, wherein the instructions, when executed, cause the processor circuit to classify respective vocalizations from amongst the identified vocalizations as to whether respective vocalizations indicate distress.

38. The system of claim 36, wherein the instructions, when executed, cause the processor circuit to classify the respective vocalizations includes classifying whether the respective vocalizations indicate comfort or distress.

39. The system of claim 38, wherein the classifying the respective vocalizations includes using a second metric indicative of respective vocalizations.

40. The system of claim 39, wherein the classifying the respective vocalizations includes identifying a profile corresponding to at least one of a comfort vocalization or a distress vocalization and correlating a detected vocalization with the profile to provide the second metric.

41. The system of claim 40, wherein the profile comprises a temporal profile.

42. The system of claim 39, wherein the classifying the respective vocalizations includes applying a machine-learning model trained to label an audio stream in manner indicative of a classified vocalization.

43. The system of claim 24, wherein the directional microphone has a shotgun receive pattern in a specified plane with a main lobe extending axially from the microphone in a boresight direction.

\* \* \* \* \*